United States Patent [19]

Goodman

[11] Patent Number: 4,699,457

[45] Date of Patent: Oct. 13, 1987

[54] OPTICAL FIBER SWITCH AND METHOD OF MAKING SAME

[75] Inventor: Jack E. Goodman, Germantown, Md.

[73] Assignee: Optelecom Incorporated, Gaithersburg, Md.

[21] Appl. No.: 771,725

[22] Filed: Sep. 3, 1985

[51] Int. Cl.$^4$ .............................. G02B 6/36; G02B 6/10
[52] U.S. Cl. .................................. 350/96.20; 350/96.13
[58] Field of Search ............... 350/96.13, 96.14, 96.15, 350/96.20, 96.21

[56] References Cited

U.S. PATENT DOCUMENTS

| | | | |
|---|---|---|---|
| 4,189,206 | 2/1980 | Teral et al. | 350/96.20 |
| 4,193,662 | 3/1980 | Hara | 350/96.15 |
| 4,607,910 | 8/1986 | Thurenius | 350/96.2 |
| 4,610,504 | 9/1986 | Thurenius et al. | 350/96.2 |

FOREIGN PATENT DOCUMENTS 0098815 1/1984 European Pat. Off. ......... 350/96.13
0007601 1/1983 Japan .............................. 350/96.13

Primary Examiner—Eugene R. LaRoche
Assistant Examiner—Steven J. Mottola
Attorney, Agent, or Firm—Kerkam, Stowell, Kondracki, & Clarke

[57] ABSTRACT

An inexpensive and efficient switching device for use with optical fibers is disclosed wherein at least three optical fibers are mounted in the switching device with one of the at least three fibers mounted in a fixed magnetic block and the at least two fibers are mounted or fixed to a sliding nonmagnetic block. The blocks are held relative to a fixed base to which the fixed block is secured by means of permanent magnets and the switch is actuated by means of an electromagnet. Stops are provided for the sliding block to insure accurate alignment of the fibers to be switched during switch actuation and transmission of information in the fibers.

3 Claims, 8 Drawing Figures

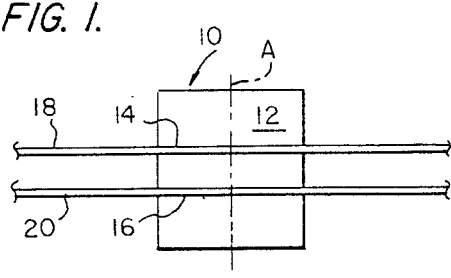
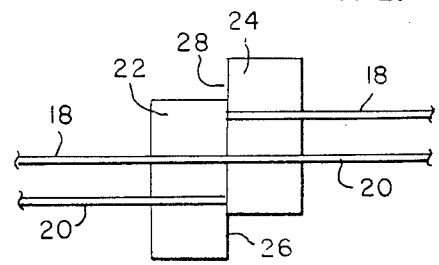
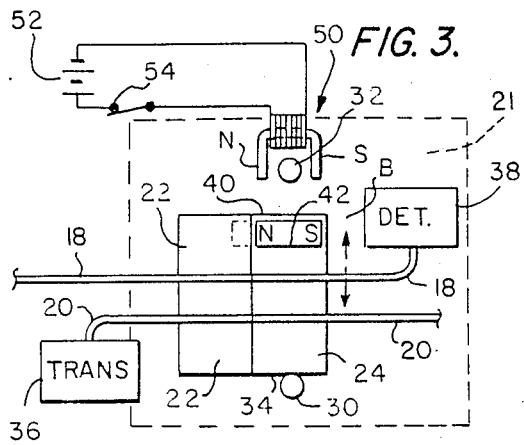
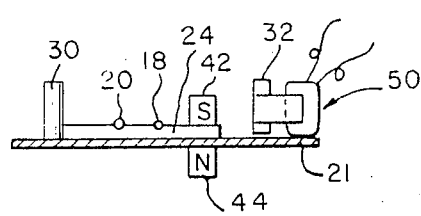
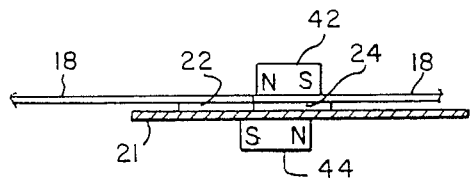
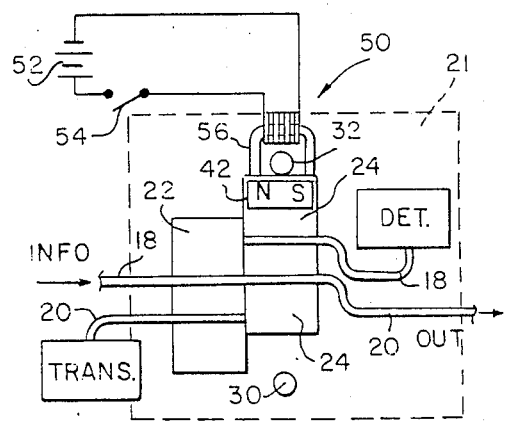
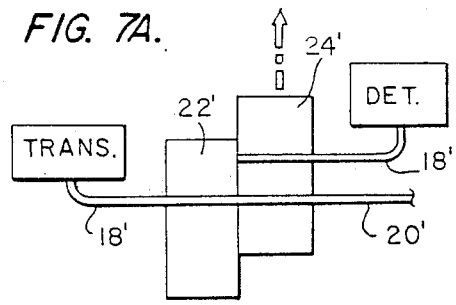
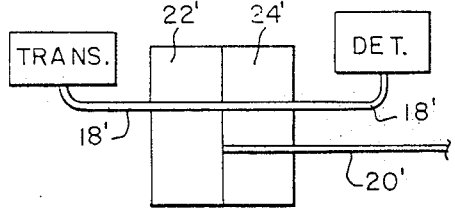

OPTICAL FIBER SWITCH AND METHOD OF MAKING SAME

FIELD OF THE INVENTION

This invention relates to an optical fiber switch for switching radiant energy between at least three optical fibers. At least one of the fibers being fixed and the other at least two fibers being arranged so as to move in accordance with the magnetic field.

Examples of devices having optical switching functions are found in U.S. Pat. No. 4,189,206, Terai, et al. and 4,193,662, Hara.

SUMMARY OF THE INVENTION

It is a primary object of this invention to provide a relatively inexpensive optical switching device for use in switching optical paths and capable of providing highly accurate coupling while at the same time providing a very low radiant energy loss at the interface of the optical fibers at the switching junction.

The invention may be generally defined as a fiber optical switching device comprising a nonmagnetic base member, a nonmagnetic first block fixed to said base member to which is rigidly affixed at least one optical fiber, with an end face of the at least one optical fiber positioned transverse to and aligned with one edge of the first block. A second magnetic block moveable in respect to the base member to which is affixed at least one pair of spaced generally parallel optical fibers with an end face of each of the at least one pair of fibers positioned transverse to and aligned with one edge of the second block. A first permanent magnet affixed to the base member below the second block. A second permanent magnet affixed to the upper face of the second block with the poles thereof oriented opposite to the poles of the first permanent magnet. An electromagnet mounted adjacent the second permanent magnet and a pair of stop members. One of the stop members positioned to engage the second block when the block is moved by the electromagnet toward the magnet a distance equal to the space between the at least one pair of optical fibers. The other of the pair of stop members positioned to engage the second block when the second block is moved in the opposite direction a distance equal to the space between the at least one pair of optical fibers.

The invention may also be defined as a method of making an optical fiber switching device comprising the following steps. Cutting at least two parallel spaced apart grooves in a block of magnetic material. Affixing optical fibers in the grooves. Cutting the fiber affixed block transverse to the axis of the fibers into first and second blocks. Polishing the cut edges of the first and second blocks. Attaching the first block to a nonmagnetic base member. Attaching a first permanent magnet to the base member below the second block. Attaching a second permanent magnet to the upper face of the second block with the poles thereof oriented opposite to the poles of the first permanent magnet. Mounting an electromagnet adjacent the second permanent magnet. Providing a first stop member to engage the second block when the second block is moved by the electromagnet, toward the electromagnet a distance equal to the space between the parallel spaced grooves and providing a second stop member to engage the second block when the permanent magnet moves the second block an equal distance in the opposite direction.

BRIEF DESCRIPTION OF THE DRAWING

The invention will be described in greater detail with reference to the drawing wherein:

FIG. 1 illustrates a first step in forming the optical switch of the invention;

FIG. 2 illustrates a further step in forming the optical switch;

FIG. 3 is a simplified top plan view of an optical switch of the invention;

FIG. 4 is an end view of the device shown in FIG. 3;

FIG. 5 is a simplified front view of the device shown in FIGS. 3 and 4;

FIG. 6 is a view like that shown in FIG. 3 with the electromagnet de-energized; and FIGS. 7A and 7B are optical schematical views of another form of the present invention.

DETAILED DESCRIPTION OF THE PREFERRED EMBODIMENTS

The invention will be more particularly described in reference to the drawings and to an embodiment wherein there are a pair of optical fibers. In the drawings the spacing of the pair of fibers is greatly enlarged and in an actual embodiment the distance between the fibers may be in the order of about .015 inch. It is to be understood that the switching device of the present invention will function with a lesser or greater number of optical fibers as will be realized from the following detailed description.

Referring to FIGS. 1 and 2, 10 generally designates a block of magnetic material which in the illustrated embodiment comprises a silicon wafer. Across the face 12 of the wafer 10 are made a pair of parallel spaced cuts 14 and 16. Into each of the cuts or grooves 14 and 16 are affixed a pair of optical fibers 18 and 20. The optical fibers may be conventional single mode optical fibers or a bundle of fibers, and the pair of fibers are affixed to the wafer 10 by epoxy cement. After the cement has hardened, the wafer 10 is cut along line A to provide a first block 22 and a second block 24. Face 26 of block 22 and edge face 28 of block 24 are ground and polished, and it will be recognized by those skilled in the art that by polishing the edges 26 and 28 the end faces of fibers 18 and 20 will also be polished.

Referring now to FIGS. 3–6, block 22 is immobilized to a suitable nonmagnetic base 21 and block 24 is mounted for sliding motion as indicated by arrow B. The base 21 should be nonmagnetic, such as glass, aluminum, plastic, etc. The limit of the sliding motion is determined by a pair of stop pins 30 and 32. In the position illustrated in FIG. 3, edge 34 of block 24 is in engagement with stop pin 30 and severed fibers 18 and 20 are aligned and in communication across both blocks 22 and 24.

By way of illustration, one end of optical fiber 20 is connected to a transmitter 36 to transmit information through the fiber 20 to, for example, a dump or a detector not shown. In respect to fiber 18, one end is connected to a detector and the opposite end to, for example, another transmitter not shown for clarity. When the edge 40 of block 24 is in engagement with stop member 32 as shown in FIG. 6, fiber 18 is connected to fiber 20 and information in fiber 18 passes to fiber 20 via the switch of the invention.

It is essential that the two blocks 22 and 24 be held together and held flat and to accomplish this there is cemented to the top surface of block 24 a permanent magnet 42 and to the bottom surface of the base 21 is cemented permanent magnet 44. The orientation of the poles of magnet 44 is opposite to the orientation of the poles of magnet 42 as more cleverly illustrated in FIG. 5. It will also be noted from FIGS. 3 and 5 that magnet 44 is off-set from block 22 toward block 24. With this arrangement, the unlike poles attract each other and exert a constant force holding the blocks to each other along the cut line between the blocks and also that the blocks are held flat relative to base 21.

The sliding half of the assembly must not only be held flat against a base as well as against the stationary fibers, which is accomplished by the pair of magnets 42 and 44.

Since the movement of the movable block relative to the fixed block may be only approximately .015 inch, in order to assure accurate alignment of the fibers in the two blocks the high accuracy and small motions involved rule out the use of levers and springs as the actuating means for the switching device. Instead, the sliding force is generated by an iron core electromagnet generally designated 50 which electromagnet is connected to a suitable source of electric power 52 via an actuating switch 54.

In FIG. 3, the two pole pieces of the electromagnet are designated N and S such that when the switch 54 is closed, the electromagnet repels the magnet 42 affixed to the sliding block 24 and moves the switch in accordance with the alignment shown in FIG. 4 with the edge 34 against the stop 30. When the switch 54 is open as shown in FIG. 6, the fixed magnet 42 attached to the sliding block 24 is attracted to the iron core 56 of the electromagnet 50 to switch the positions of the optical fiber so that fiber 18 is connected to fiber 20.

In FIGS. 7A and 7B, a schematic of a modified form of the invention is illustrated wherein fiber 18' is the only fiber that appears in both the fixed block 22' and the sliding block 24', and fiber 20 only extends to edge 28' of the sliding block 24'. In this way, the transmission of information when the electromagnet is de-energized is from fiber 18' to 20', and when the electromagnet is energized as per FIG. 3, the transmission is through the switch and fiber 18' only.

I claim:

1. A fiber optic switching device comprising a nonmagnetic base member, a nonmagnetic first block rigidly fixed to said base member, means rigidly affixing at least one optical fiber to said block with one end face of the at least one fiber positioned transverse to and aligned with one edge of the first block, a second nonmagnetic block moveable with respect to the base member, at least two optical fibers affixed to the second block in spaced parallel array with an end face of each said at least one pair of fibers positioned transverse to and aligned with one edge of the said second block, a first permanent magnet affixed to the base member below the second block, a second permanent magnet affixed to the upper face of the second block with the poles of the magnet oriented opposite to the poles of the said first magnet, an electromagnet mounted adjacent the second permanent magnet, a pair of stop members, one of said stop members mounted to engage the second block when the second block is moved by the electromagnet away from the electromagnet a distance equal to the space between the at least one pair of optical fibers, said other of the pair of stop members positioned to engage the second block when the second block is moved in the opposite direction a distance equal to the space between the at least one pair of optical fibers.

2. The invention defined in claim 1 wherein the first and second blocks comprise silicon and wherein there are at least two optical fibers in the first and second blocks.

3. A method of making an optical fiber switching device comprising the steps: cutting at least two spaced apart parallel grooves in a nonmagnetic block; affixing an optical fiber in each of said grooves; cutting the fiber affixed block transverse to the fiber axes into first and second blocks; polishing the cut edges of the first and second blocks; attaching the first block to a nonmagnetic base member; attaching a permanent magnet to the base member below the second block; affixing a second permanent magnet to the upper face of the second block with poles thereof oriented opposite to the orientation of the first permanent magnet; mounting an electromagnet adjacent the second permanent magnet; providing a first stop member to engage the second block when the second block is moved by the electromagnet away from the electromagnet a distance equal to the space between the parallel spaced grooves; and providing a second stop member to engage the second block when the second block is moved in the opposite direction by the electromagnet a distance equal to the spaces between the parallel space grooves in the second block.

* * * * *